July 26, 1955     S. O. GOLDSMITH     2,713,725
TUBE GAGE
Filed Oct. 7, 1954     3 Sheets-Sheet 1
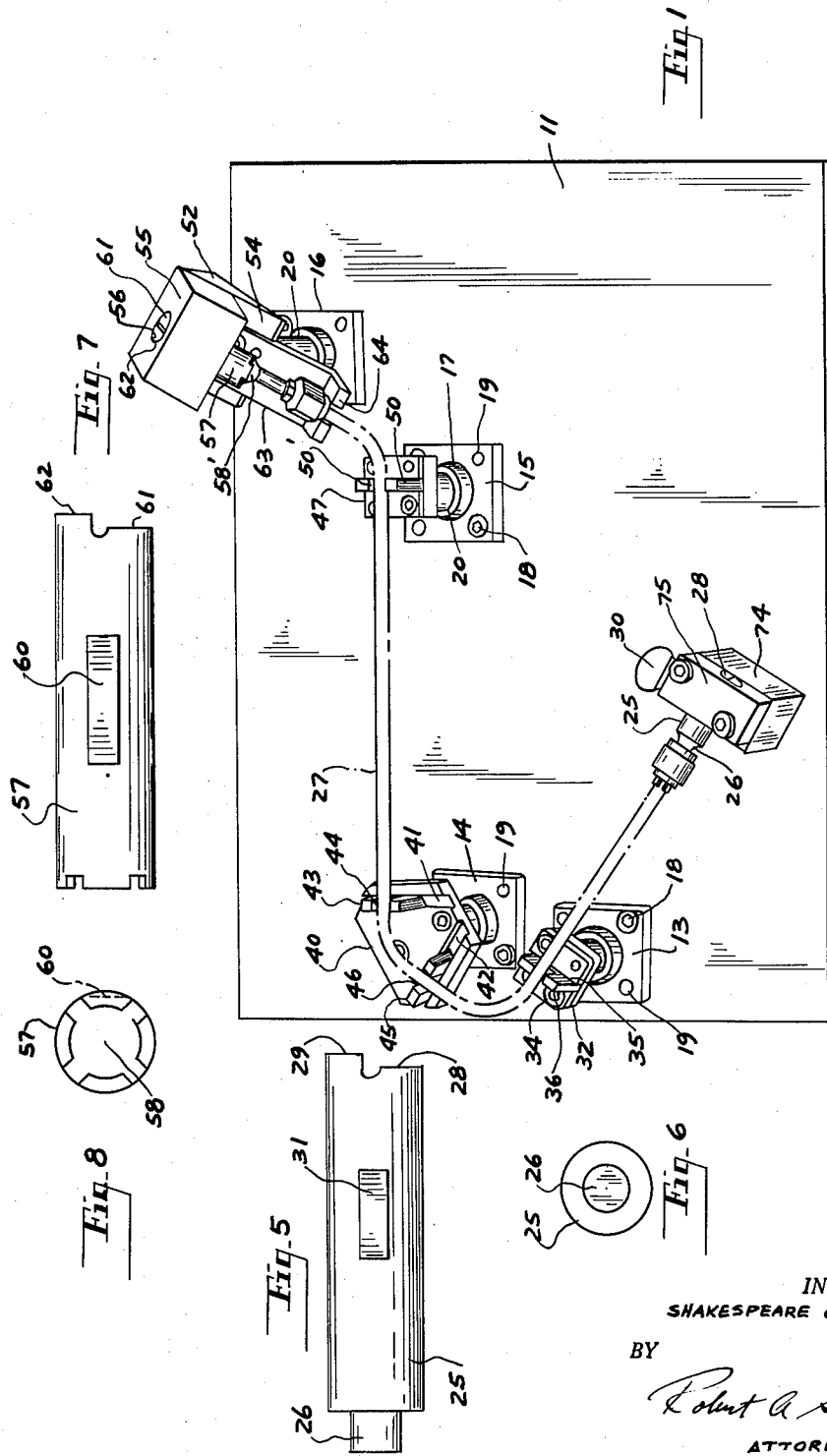
INVENTOR.
SHAKESPEARE O. GOLDSMITH
BY
Robert A. Sloman
ATTORNEY

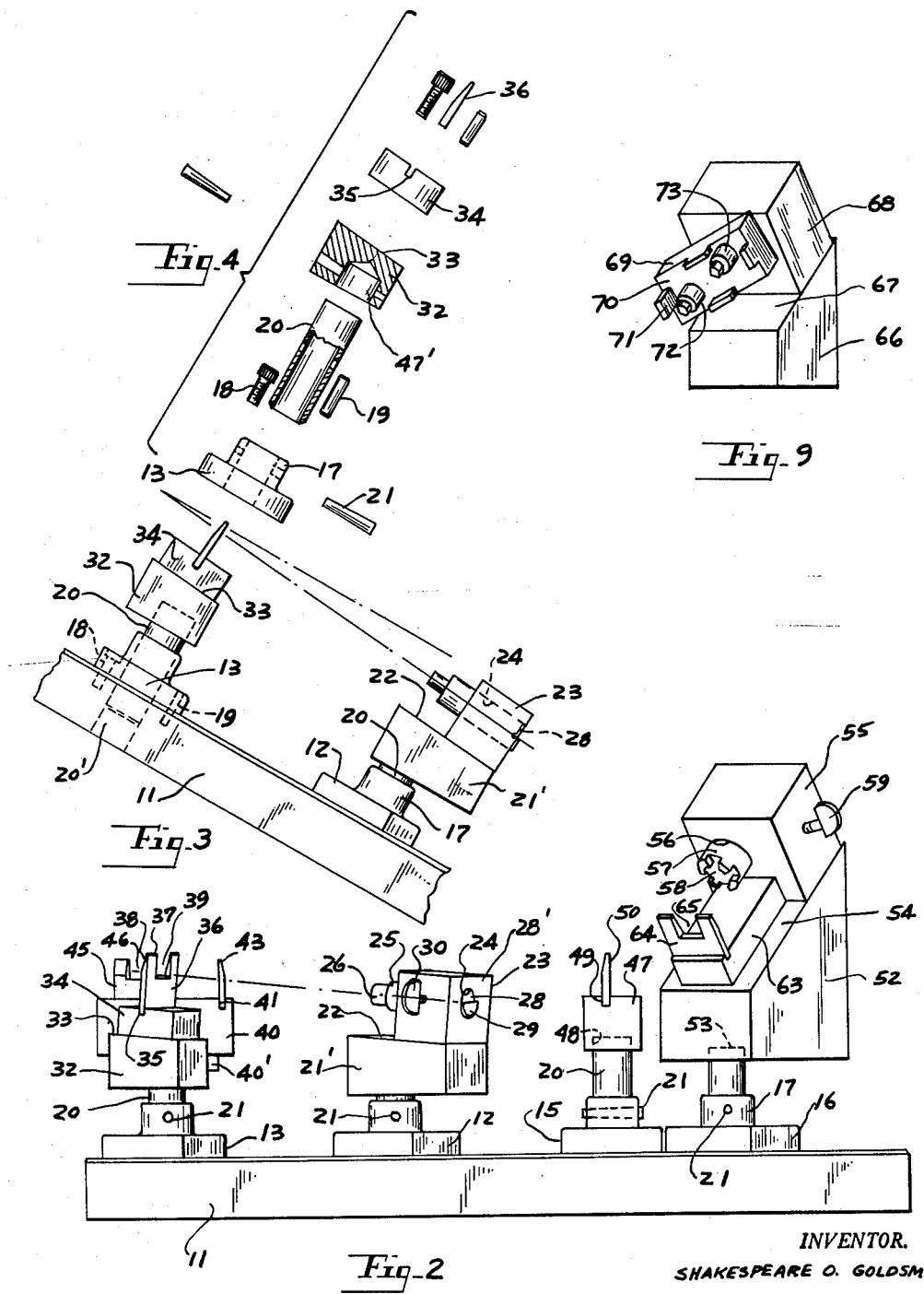

July 26, 1955
S. O. GOLDSMITH
2,713,725
TUBE GAGE
Filed Oct. 7, 1954
3 Sheets-Sheet 3
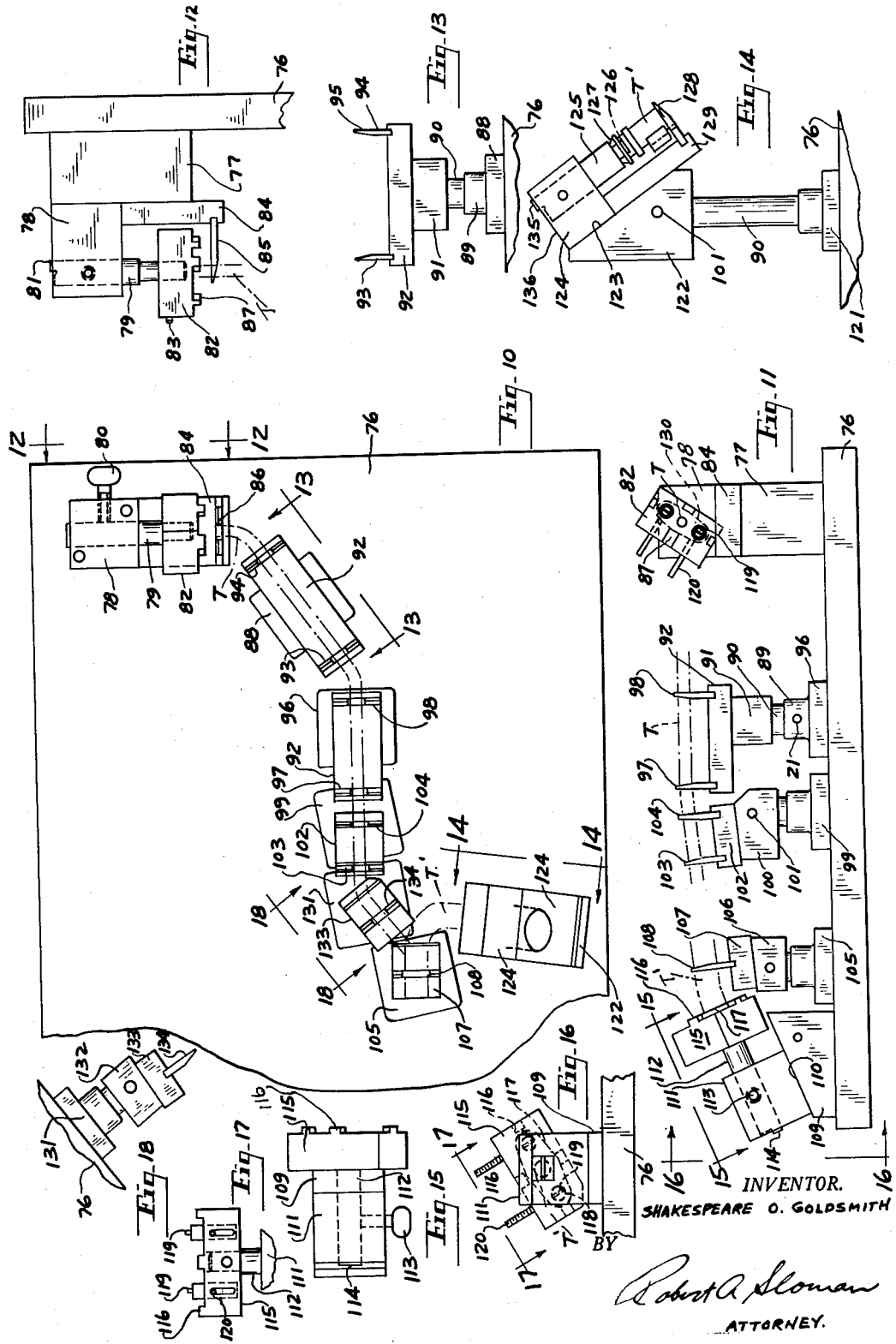
INVENTOR.
SHAKESPEARE O. GOLDSMITH
BY
Robert A. Sloman
ATTORNEY.

United States Patent Office 2,713,725
Patented July 26, 1955

2,713,725
TUBE GAGE
Shakespeare O. Goldsmith, Detroit, Mich.

Application October 7, 1954, Serial No. 460,858

28 Claims. (Cl. 33—174)

This invention relates to a tube gage and, more particularly, to a novel construction of gage for checking the shape and contour of a fabricated tube in accordance with predetermined specifications.

Heretofore it has been a difficult task to accurately check the formation and construction of a tube which is of irregular shape in order to ascertain whether it comes up exactly to specification.

It is the object of the present invention to provide a simple tube gage which is so constructed as to be effective in checking the respective formed ends of the tube, as well as all intermediate portions thereof in order to tell at a glance whether the said tube has been formed in accordance with predetermined specifications.

It is the further object of the present invention to provide upon a suitable support a series of gage elements which are anchored to the support and which carry thereon tube engaging elements which are arranged at exactly the desired angle and elevation, so that application of the formed tube to the gage will provide an immediate indication as to whether the tube has been properly formed and is of the correct dimension, profile and contour.

These and other objects will be seen from the following specification and claims in conjunction with the appended drawings in which—

Fig. 1 is a perspective view of the present tube gage.

Fig. 2 is a side elevational view thereof.

Fig. 3 is a fragmentary angular elevation of a pair of the gage elements shown in Fig. 2.

Fig. 4 is an exploded view partially in section of one of said gage elements.

Fig. 5 is an elevational view of one type of flush pin employed.

Fig. 6 is an end elevational view thereof.

Fig. 7 is a front elevational view of another type of flush pin employed.

Fig. 8 is an end elevational view thereof.

Fig. 9 is a perspective view of a slightly different form of end-of-part gage element.

Fig. 10 is a fragmentary plan view of a slightly different form of a gage.

Fig. 11 is a front elevational view thereof, but illustrating more of the structure of such gage.

Fig. 12 is a view taken on line 12—12 of Fig. 10.

Fig. 13 is a fragmentary elevational view taken on line 13—13 of Fig. 10.

Fig. 14 is a fragmentary elevational view taken on line 14—14 of Fig. 10.

Fig. 15 is a fragmentary plan view taken on line 15—15 of Fig. 11.

Fig. 16 is a fragmentary elevational view taken on line 16—16 of Fig. 11.

Fig. 17 is a fragmentary plan view taken on line 17—17 of Fig. 16; and

Fig. 18 is a fragmentary elevational view taken on line 18—18 of Fig. 10.

It will be understood that the above drawings illustrate merely a preferred embodiment of the invention and other embodiments are contemplated within the scope of the claims hereafter set forth.

Referring to the drawings Figs. 1 and 2, there is shown a rectangular platform 11, having variably positioned thereon a series of spaced upright supports 12, 13, 14, 15 and 16, each including a central upright vertically apertured boss 17 adapted to receive the upright tubular standards 20.

Each of the supports are effectively secured in a desired located position by a pair of oppositely arranged screws 18 which project down into the platform; and, additionally, there are provided with each support one or more locating dowel pins 19, as illustrated in Fig. 3.

Tapered pin 21 projects transversely through boss 17 and through corresponding apertures in tube 20 for securing said tube in the desired upright position shown in Fig. 2.

Mounted upon standard 20, corresponding to support 12, and at the upper end of said standard, there is provided a base block 21' which has corresponding undercut recess adapted to cooperatively receive the upper end of support 20, in the manner illustrated in Fig. 4.

In the present illustrative example of the tube gage, the top surface of block 21' is slightly tapered as at 22 and has mounted and secured thereon an end-of-part body 23.

Said body has extending therethrough a cylindrical recess 24 adapted to slidably receive the cylindrical elongated flush pin 25, which has a reduced cylindrical male projection 26 at one end adapted for projection within one end of the tubular element to be gaged by the present mechanism, the outer end of such tube to be gaged cooperatively bearing against the end portion of flush pin 25, the tube to be gaged being shown in dotted lines at 27 in Fig. 1.

The said flush pin at its opposite end has a semicircular flat surface 28, which is adapted for cooperative registry with the end surface 28' of block 23. The other portion 29 of the said pin is longitudinally extended slightly beyond the end portion 28 and is also of semicircular shape, and may project slightly outward of the end face 28' of block 23.

There is also provided a locking key 30, shown in Figs. 1 and 2, having a laterally projecting threaded shaft which threadedly engages block 23 and extends to the transverse passage 24 therein and is adapted for operative securing engagement at the flat surface 31 Fig. 5 of said flush pin for retaining such flush pin in the desired position of adjustment. Key 30 is of the same construction as key 80 shown in Fig. 10.

Mounted upon standard 20 corresponding to support 13, there is provided a second base block 32 whose top surface in the preferred embodiment herein is tapered at 33 and has mounted thereon and secured thereto the block or riser 34. Said block has a transverse elongated slot 35 formed in its upper surface within which is removably positioned and secured the substantially upright, though slightly tilted, yoke 36, which is bifurcated at its upper end as at 37 defining the central upright recess 39 adapted to cooperatively receive a portion of the tube 27 to be gaged.

The bifurcated portions 37 of yoke 36 are tapered at their rear surfaces as at 38 to provide additional clearance for the tube to be tested in view of the particular contour thereof, said tube being adapted to supportably rest upon a portion of yoke 36 which forms the bounding bottom wall of slot 39.

Mounted upon the third support 14 shown in Fig. 1, and upon the tubular standard 20 at its upper end is still another body block 40' which is suitably apertured in its under-surface similar to the aperture in body block 32 shown in Fig. 4.

Mounted upon and secured to the top surface of block 40' is an irregularly shaped riser or support 40, Figs. 1 and 2 which in the present embodiment has a substantially flat surface. There are formed within the top surface of riser 40, a pair of angularly related elongated slots 41 and 42, which are of substantially rectangular shape in cross section and within which are slidably positioned and secured a pair of upright angularly related yokes 43 and 45, which are of substantially the same construction as yoke 36 and which are bifurcated at their upper ends to define the tube receiving upright slots 44 and 46, respectively.

Projecting above upright support 15 and mounted upon the tubular support 20 is still another riser block 47, whose undersurface has a circular recess 48 adapted to cooperatively and adjustably receive the upper end of standard 20.

It is contemplated that the height of the riser with respect to any particular support will be variable depending upon the particular contour and shape of tube to be gaged. Consequently, and as illustrated in Fig. 3, the said tube 20 in each case projects partially down into the recess 20' formed in platform 11.

Riser block 47 also has formed in its top surface a transverse slot 49 adapted to cooperatively and adjustably receive and retain therein the substantially upright yoke 50, which as shown in Fig. 1 is bifurcated to define the tube receiving slot 50', as indicated in Fig. 1.

In order to properly gage the particular tube there must be provided an additional end-of-part gage element for the opposite end of the tubular-element. For this purpose there is provided in conjunction with support 16 and mounted upon tube 20 the block 52, whose undersurface is recessed as at 53 for receiving said tube.

Block 52 has a tapered or angular surface 54 at its upper end, which angle is determined in each case by the angularity of the corresponding end portion of the tube to be gaged.

End-of-part body block 55 is mounted upon surface 54 and suitably secured thereto as by screws so that its transverse central axis lies in a plane parallel to tapered surface 54.

Block 55 similarly to block 23 has a transverse cylindrical recess 56 adapted to slidably and adjustably receive the female type of flush pin 57 shown in Fig. 2. Of course, a male type of flush pin would be employed if the opposite ends of the tube to be gaged were the same. However, assuming that the present tube to be gaged has a fitting thereon, the said flush pin 57 has provided a series of circularly arranged spaced arcuate segments projecting from its end face 58 adapted to cooperatively receive the particular fitting 58' shown in Fig. 1, with the end of the tube bearing against surface 58.

The particular flush pin 57 which happens to have been used for illustration in Fig. 2 is shown in further detail in Figures 7 and 8 and has a flat surface 60 upon one side thereof adapted to cooperatively receive the inner end of the set screw or hand screw 59 whereby said flush pin may be secured in a desired adjusted position.

The end toward the opposite end portion of flush pin 57 is substantially the same as the corresponding end portion of flush pin 25, and as shown in Fig. 7 has one flattened wall 61 of semi-circular shape adapted for cooperative registry with the outer end wall of block 55. Longitudinally projected therefrom is a second semi-circularly shaped end face element 62, which for gaging purposes may project slightly beyond the surface of block 55.

For illustration, assuming that the tolerated limit of length of the particular tube is the longitudinal displacement between the two end faces 61 and 62 in a gaging operation, the alignment of face 61 with the surface of the block might indicate one limit as to length, whereas, the alignment of the other face 62 of the flush pin might indicate the other limit as to length, so that those parts which gage in between would be acceptable and all others rejected.

Referring to Fig. 2, mounted upon the inclined surface 54 of block 52, is an elongated rectangular shaped riser 63, which has a transverse slot at one end within which is slidably positioned and secured upright yoke 64. The upper portion of said yoke is bifurcated to define the tube receiving slot 65 whose central axis is substantially in alignment with the central longitudinal axis of flush pin 57.

This completes the formation of one embodiment of the present invention pertaining to a tube gage and whereas in there are employed a pair of end-of-part gage elements to cooperatively receive the respective opposite ends of a tubular element to be gaged. Intermediate said end-of-part gage elements, there are interposed a series of variably positioned intermediate gage elements which are of such shape and are so arranged as to accurately receive portions of the tube to be gaged throughout its length, in such manner and at certain critical points thereon as to particularly define a predetermined contour, profile and shape, and at the same time gaging the object as to its overall length.

While there have been shown in the preferred embodiment 5 such supports 12, 13, 14, 15 and 16, it is contemplated that the number thereof could be changed, depending upon the particular shape of the tube to be gaged and the number of turns or changes in its contour.

By the same conditions, the blocks 21', 32, 40' and 40, as well as blocks 47 and 52, may be of different shape and have controlling surfaces of different angularity depending upon the particular job.

The present invention contemplates the interchangeability of parts and the adjustability of the height of the various standards 20 which project through the support flanges 12, 13, 14, 15 and 16; thus, the height of the respective gage element may be regulated as may also the angularity of the respective tube receiving yokes, depending upon the positioning of the slots in the blocks and their location with respect to the supports.

In a gaging operation it is assumed that the respective gage elements forming a part of the present tube gage have been assembled in the correct relationship and of the correct angularity and arrangement as to accurately receive the various portions of a tube standard or model which serves as a guide and wherein the respective end portions of the standard tube are received by the flush pins 25 and 57 which may then be set in position and locked if desired, as by the set screws 30 and 59. At the same time, other spaced portions of the tube throughout its length will be cooperatively received within the apertures in the various spaced yokes, which yokes and their supports are set to the set standard and immovably secured in position.

This means that thereafter, upon the construction of tubes in accordance with the original standard, the said tubes must also fit the gage elements in the same manner as the standard tube fit the gage elements.

This type of a gage is particularly important; for example, in engine construction where various types of tubes and conduits in metal are formed in irregular shapes and where it is of utmost importance that the tube be exactly of a correct shape.

In Fig. 9 there is illustrated merely a slight variation of the end-of-part body, which includes the block 66 with inclined surface 67, upon which is positioned and suitably secured the end-of-part body block 68.

Mounted and secured upon one of the side walls of block 68 is an end plate 69, having a tube end engaging flat surface 70 and a series of upright projections 71 adapted to cooperatively receive a special type of fitting upon one end of the tube to be gaged.

In this case there are also provided a pair of outwardly projecting flush pins or bosses 72 and 73, which are suitably secured to plate 69 in predetermined spaced relation, which bosses are adapted to cooperatively receive the open end portions of a fitting upon the corresponding end of a particular tube to be gaged.

It will be noted in Fig. 1 that the first gage element which corresponds to the end-of-part gage element 12—21' of Fig. 2, is slightly different in that it includes a rectangular base block 74, upon which is positioned and secured an end-of-part body block 75, and through which adjustably projects a flush pin such as the flush pin 25 shown in Fig. 2, and which is secured in the desired position of longitudinal adjustment by corresponding set screw 30.

It is contemplated that the present invention may have many embodiments within the scope of the claims hereinafter set forth and, naturally, the particular embodiment of the invention would incorporate more or less intermediary gage elements of a particular size, shape and inclination corresponding to the changes in curvature of the particular tube sought to be gaged.

A slightly different form of tube gage is shown in Figs. 10 through 18, wherein the tube shown in phantom has a branch, thereby necessitating a slightly different form of gage construction.

Referring to Figs. 10 through 18, there is shown a rectangular platform 76, upon which are variably positioned at exactly predetermined points a series of spaced upright supports 77, 88, 96, 99, 131, 105, 121 and 109, which supports are suitably and immovably secured to said platform in any convenient manner such as by the screws shown at 18 in Fig. 3. Support 77 is shown in Figs. 11 and 12, support 121 is shown in Fig. 14, and support 109 is shown in Figs. 11 and 16.

The majority of said supports include the upright annular boss 89, within which is slidably positioned the upright tubular standard 90, over which are mounted certain supporting blocks hereafter described in detail, whose under surfaces are recessed to receive and be secured over the upper ends of the said standards 90 in the same manner as the block 32 of Fig. 4 is secured to tubular standard 20.

Furthermore, the said supports 90 are effectively secured in the desired position of vertical adjustment with respect to boss 89 by tapered pins 21, the same as is shown in Fig. 2, said platform 76 having a series of transverse apertures therethrough similar to aperture 20' of Fig. 3 to receive portions of the tubular standards 90. Mounted upon each of the supports above mentioned will be the desired form of base block such as base block 91 of Fig. 11.

Now referring to Figs. 10, 11 and 12, support 77 is in the form of a rectangular block and has mounted and secured thereon the end of part body 78, which is horizontally apertured in this illustration to slidably receive the flush pin 79, having an offset end surface 81 similar to offset 62 of Fig. 7. End-of-part receiving block 82 is secured to the opposite end of said flush pin as by the set screw 83, said block 82 having a series of spaced projections 87 as in Fig. 11, within which is cooperatively positioned the formed fitting 130 upon the end of tube T. It will be seen from Fig. 11 that this portion of the tube is so bent and the fitting 130 is so angularly arranged that, accordingly, the block 82 must assume a similar angular position in order to function correctly as an end-of-part gage element. The said fitting 130 has a pair of spaced apertures therethrough which are adapted for registry with the flat end pins 119 which project outwardly from the corresponding bores formed in block 82 and extend outwardly from the face of said block, being suitably secured and positioned by the set screws or locking pin 120 to thereby give a positive location for the fitting 130 upon the end of the tube to be gaged. Hand screw 80 projects from body 78 and is adapted to secure flush pin 79 in any desired predetermined position.

Mounted upon block 77 is a rectangular riser 84 which is transversely slotted at one end to supportably receive upright yoke 85, which has a central transverse aperture 86 for cooperatively receiving the adjacent portion of the tube to be gaged.

Support 88 and its boss 89 as shown in Figs. 10 and 13 receives the tubular standard 90 carrying base block 91 in the manner above described, which supports upon its top surface riser block 92, which has a pair of transverse slots adjacent its opposite ends for cooperatively receiving and securing the upright slotted yokes 93 and 94 which will cooperatively and gagingly receive adjacent portions of tube T. The outer non-tapered edge 95 of the said yoke is the actual gaging point in testing the part.

Next in succession is the support 96 shown in Figs. 10 and 11, over which is mounted the base block 91' which supports riser 92' similarly transversely slotted upon its upper surface for rigidly supporting the parallel spaced yokes 97 and 98 for cooperatively receiving an adjacent portion of the tube to be gaged.

The next support 99 similarly carries the base block 100, which is secured as are all of said blocks, to the tubular support by the transverse pin 101.

Here the tube to be gaged has a slight downward taper and, accordingly, the top surface of block 100 is similarly tapered downwardly and has mounted and secured thereover riser 102. This riser also has a pair of spaced transverse slots which supportably receive the longitudinally spaced slotted yokes 103 and 104 for cooperatively receiving a portion of the tube to be gaged.

The adjacent support 131, shown in Fig. 18 in detail, carries in the same manner the base block 132 and secured thereon riser 133 slotted to supportably receive apertured yoke 134 for receiving the adjacent portion of the tube to be gaged. In this connection Fig. 10 illustrates that the said tube has now made a substantial angular turn, which is accurately gaged by the yoke 134. Beyond this point of the tube there is a branch pipe designated as tube T', which is secured to the said tube T and, consequently, the opposite ends of said branch will require the use of a pair of end-of-part gage elements.

As shown in Figs. 10, there is an intermediate support 105, also shown in Fig. 11, which receives a portion of the tube T' and which includes the base block 106, whose top surface is slightly inclined to correspond to the inclination of the tube element T', and which has secured thereto riser block 107 and which carries the slightly inclined yoke 108, which gagingly receives a portion of the tube T', as shown best in Fig. 11.

Adjacent support 105 is supporting block 109 suitably secured to platform 76 and having an inclined top surface 110 which corresponds exactly to the inclination at one end of the tube element T' to be gaged. Mounted and secured thereon is the end-of-part body block 111, which is longitudinally apertured on an axis parallel to surface 110 for slidably receiving therethrough flush pin 112, which may be secured in the desired position of adjustment by the set screw 113 shown in Fig. 15, said flush pin having the offset gaging surface 114 which projects beyond the end of block 111 and which functions in the manner above described in conjunction with the flush pin 57 of Fig. 7.

This particular tube element T' also carries an angularly arranged fitting 117, shown in Fig. 16, and which also has a pair of transverse apertures 118 therethrough. End-of-part gage block 115 is secured to the outer end of flush pin 112 and has in its outer gaging surface a plurality of outwardly projecting bosses 116, which are so arranged as to cooperatively receive therebetween the said fitting 117. The block 115 also has a pair of transverse apertures adapted to slidably receive the pins 119 which, if the fitting 117 is correctly formed, will cooperatively register within the fitting apertures 118, the said pins 119 being secured in predetermined position by the set screws 120, which, as shown in Fig. 16, are illustrated in their outermost non-securing position.

There is provided a third end-of-part gage element for cooperatively receiving the other end of tube element T' and the fitting 127 thereon in the manner best illustrated in Fig. 14.

This gage element includes the support 121 and at the upper end of the intervening standard 90 is secured the base block 122. In view of the very substantial inclination of this portion of the tube to be gaged, there is formed upon block 122 an inclined surface 123 corresponding to this inclination, and secured thereon is the rectangular end-of-part body block 124, which is transversely apertured for slidably receiving the flush pin 125, which is secured in the desired position by a suitable hand screw similar to the screw 113 of Fig. 15.

Flush pin 125 has a reduced cylindrical projection 126 at its outer end adapted to be projected within the corresponding outlet opening in fitting 127 on tube element T'. The opposite end of flush pin 125 has an offset gaging surface 135 for cooperation with the corresponding end wall 136 of block 124.

The adjacent portion of this end of tube element T' gagingly passes through the yoke 128 which is mounted upon the outer end transversely of riser block 129 also secured upon inclined surface 123 of base block 122.

Thus there has been described with respect to Figs. 10 through 18 a slightly different form of tube gage than that shown in Fig. 1, inasmuch as the tube element T to be gaged has a branch pipe T' projecting therefrom, and furthermore, each of the ends of the said branch pipe and tube have special fittings which must be of a specific shape and angle of inclination.

The tube gage shown in Fig. 10 is, therefore, of a slightly more complicated construction than that shown in Fig. 1 but, nevertheless, serves as a very accurate means of checking a fabricated tube for determining its exact profile and contour and angularity in all directions throughout 360 degrees, and at the same time, verifying that the fittings upon the ends of the tube are of the correct shape and inclination.

Having described my invention, reference should now be had to the claims which follow for determining the scope thereof.

I claim:

1. A gage for checking the length, contour and profile of a tube comprising a platform, a series of upright supports positioned and secured upon said platform in predetermined spaced relation over the surface thereof, upright standards secured upon some of said supports and projecting thereabove, base blocks adjustable secured at the upper ends of said standards, a pair of transversely apertured end-of-part bodies respectively mounted upon a corresponding pair of other supports, tube-end engaging flush pins slidably positioned and secured within the apertures of said bodies adapted to cooperatively receive and engage the opposite ends of the tube gaged, and a series of upwardly extending tube receiving yokes upon said base blocks and angularly positioned with respect thereto as to cooperatively and slidably receive and support longitudinally spaced portions of the tube gaged.

2. The tube gage of claim 1, the end faces at the one end of said flush pins being longitudinally stepped for cooperative registry with the corresponding face of its supporting end-of-part body.

3. The tube gauge of claim 1, and manually adjustably set screws threaded into said end-of-part bodies frictionally engaging said flush pins.

4. The tube gauge of claim 1, at least one of said flush pins having a cylindrical end portion of reduced diameter for cooperative projection within the open end of the tube gauged, said end portion defining an end shoulder on said flush pin operatively engageable with the end face of the tube.

5. The tube gauge of claim 1, at least one of said flush pins having at one end a series of spaced segments of arcuate form projecting axially therefrom to cooperatively receive the end of the tube to be gauged.

6. The tube gauge of claim 1, said upright supports having flanged bases bolted to said platform and including upright bosses adapted to slidably receive said standards, and means for securing said standards in vertically adjusted position with respect to said bosses.

7. The tube gauge of claim 1, said upright supports having bases bolted to said platform and including upright bosses adapted to slidably receive said standards, and tapered pins extending through said bosses and standards for securing said standards in vertically adjusted positions.

8. The gauge of claim 1, said base blocks having undercut recesses in their under-surfaces to cooperatively receive and secure therein the upper ends of said standards.

9. The gauge of claim 1, the top surfaces of said base blocks being inclined corresponding to the inclination of the tubular part to be gauged.

10. The gauge of claim 1, and riser blocks secured upon some of said base blocks and having transverse slots formed in their upper-surfaces to cooperatively and adjustably receive said yokes.

11. The gauge of claim 1, said yokes being bifurcated to define a tube receiving slot, with the body of said yoke bounding said slot being arranged to exactly the correct position as to height and angularity in accordance with a predetermined standard.

12. The gauge of claim 1, the top surface of at least one of said base blocks supporting an end-of-part body being inclined at an acute angle to said platform, a riser block mounted on said inclined surface, and a yoke mounted transversely upon said riser block inclined at a right angle to said angular surface for cooperatively receiving the adjacent end portion of the tube gauged.

13. The gage of claim 1, said supports being vertically apertured and said standards being adjustably positioned and secured within said supports.

14. The gage of claim 1, and standards supporting said end-of-part bodies and mounted upon corresponding supports.

15. The gage of claim 1, and standards supporting at least one of said end-of-part bodies and mounted upon a corresponding support.

16. The gage of claim 1, the top surface of at least one of said supports for an end-of-part body being inclined at an acute angle to said platform.

17. The gage of claim 1, at least one of said flush pins having at one end a series of spaced segments projecting axially therefrom to cooperatively receive a formed fitting on the corresponding end of the tube gaged.

18. The gage of claim 1, and pins extending into said base blocks and standards for securing said blocks thereon.

19. The gage of claim 1, said yokes being bifurcated to define a tube receiving slot, with the body of said yoke bounding said slot being arranged to exactly the correct position as to height and angularity in accordance with a predetermined standard, the bifurcations of said yokes being tapered toward their upper ends.

20. The gage of claim 1, a riser block secured upon the support of one of said end-of-part bodies, and an upright yoke mounted transversely upon said riser block for cooperatively receiving the adjacent end portion of the tube gaged.

21. The gage of claim 1, the top surface of some of said base blocks being inclined corresponding to the adjacent inclination of the tube to be gaged.

22. The gage of claim 1, at least one of said base blocks having mounted thereon a pair of spaced angularly related tube-receiving yokes.

23. The gage of claim 1, at least one of said base blocks having mounted thereon a pair of parallel spaced tube-receiving yokes.

24. The gage of claim 1, a third end-of-part body secured upon a corresponding other support, and a transversely movable flush pin extending through said third end-of-part body adapted to cooperatively receive and gage the corresponding end of a branch of the tube gaged.

25. The gage of claim 1, a third end-of-part body secured upon a corresponding other support, and a transversely movable flush pin extending through said third end-of-part body adapted to cooperatively receive and gage the corresponding end of a branch of the tube gaged, the top surface of the support corresponding to said third end-of-part body being at an acute angle to said platform corresponding to the inclination of the end of the tube branch gaged.

26. The gage of claim 1, a third end-of-part body secured upon a corresponding other support, a transversely movable flush pin extending through said third end-of-part body adapted to cooperatively receive and gage the corresponding end of a branch of the tube gaged, and a base block with an inclined upper surface interposed between said support and third end-of-part body for determining the inclination thereof.

27. The gage of claim 1, a standard mounted upon at least one of the supports corresponding to an end-of-part body, a base block mounted on this standard, the top surface thereof being inclined and the corresponding end-of-part body being secured upon the inclined surface of said base block.

28. A gage for checking the length, contour and profile of an article comprising a platform, a series of upright supports positioned and secured upon said platform in predetermined spaced relation over the surface thereof, upright standards secured upon some of said supports and projecting thereabove, base blocks adjustably secured at the upper ends of said standards, a pair of transversely apertured end-of-part bodies respectively mounted upon a corresponding pair of other supports, article-end engaging flush pins slidably positioned and secured within the apertures of said bodies adapted to cooperatively receive and engage the opposite ends of the article gaged, and a series of upwardly extending article receiving yokes upon said base blocks and angularly positioned with respect thereto as to cooperatively and slidably receive and support longitudinally spaced portions of the article gaged.

References Cited in the file of this patent

UNITED STATES PATENTS

| 783,031 | Fell | Feb. 21, 1905 |
| 2,238,782 | Roche | Apr. 15, 1941 |
| 2,603,856 | Nelson | July 22, 1952 |

FOREIGN PATENTS

| 369,878 | Great Britain | Mar. 31, 1932 |